United States Patent
Cabaleiro (10) Patent No.: US 12,541,366 B2
(45) Date of Patent: Feb. 3, 2026

(54) SORTING ELEMENTS IN A MEMORY ARRAY BY COMPARING ELEMENT VECTORS

(71) Applicant: Imagination Technologies Limited, Kings Langley (GB)

(72) Inventor: Fabrizio Cabaleiro, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 60 days.

(21) Appl. No.: 18/534,597

(22) Filed: Dec. 9, 2023

(65) Prior Publication Data

US 2024/0231823 A1   Jul. 11, 2024

(30) Foreign Application Priority Data

Dec. 9, 2022 (GB) .................................... 2218578

(51) Int. Cl.
*G06F 9/30* (2018.01)
*G06F 15/80* (2006.01)

(52) U.S. Cl.
CPC ...... *G06F 9/30038* (2023.08); *G06F 15/8092* (2013.01)

(58) Field of Classification Search
None
See application file for complete search history.

(56) References Cited

U.S. PATENT DOCUMENTS

| | | | |
|---|---|---|---|
| 6,036,350 A | 3/2000 | Mennemeier et al. | |
| 6,144,986 A | 11/2000 | Silver | |
| 7,133,525 B1 * | 11/2006 | DeGregorio | H04N 1/4406 380/244 |
| 7,302,627 B1 * | 11/2007 | Mimar | G06F 11/27 714/E11.169 |
| 2007/0156685 A1 | 7/2007 | Inoue et al. | |
| 2017/0168827 A1 | 6/2017 | Mishra et al. | |
| 2020/0372099 A1 * | 11/2020 | Anderson | G06F 9/383 |
| 2022/0156073 A1 | 5/2022 | Anderson et al. | |

OTHER PUBLICATIONS

Bramas, Berenger, A fast vectorized sorting implementation based on ARM vector extension, 2021, PeerJ Computer Science, 24 pages. (Year: 2021).*

* cited by examiner

*Primary Examiner* — Eric Coleman
(74) *Attorney, Agent, or Firm* — Potomac Law Group, PLLC; Vincent M DeLuca (57) ABSTRACT

A method comprising comparing pairs of elements in an array. The method comprises generating two new vectors from an original array in memory, each comprising one part of each pair to be compared. The two new vectors are compared to generate a mask which indicates which of each pair of elements is less. Based on the mask, elements of the vectors can be swapped as necessary. This could be using a XOR algorithm or a merge algorithm. The vectors are then written back to the original array in memory. This process can be repeated on elements of an array as part of a bitonic sorting algorithm.

20 Claims, 5 Drawing Sheets

| v1  |   | v2  |       |    |
|-----|---|-----|-------|----|
| 010 | ⊕ | 101 | = 111 | ⟹ v1 |
| 111 | ⊕ | 101 | = 010 | ⟹ v2 |
| 111 | ⊕ | 010 | = 101 | ⟹ v1 |

SORTING ELEMENTS IN A MEMORY ARRAY BY COMPARING ELEMENT VECTORS

CROSS-REFERENCE TO RELATED APPLICATIONS AND CLAIM OF PRIORITY

This application claims foreign priority under 35 U.S.C. 119 from United Kingdom patent application 2218578.9 filed on 9 Dec. 2022, which is incorporated by reference herein in its entirety.

TECHNICAL FIELD

The present invention relates to a method of sorting data elements. In particular it relates to sorting data elements within a vector using a RISC-V vector extension.

BACKGROUND

The RISC-V vector extension provides a framework for RISC-V processors to process data arrays in addition to scalar operations. Neural network accelerators (NNAs) use large scale tensors and the RISC-V vector extension is therefore particularly useful for processing required in NNAs.

Some neural network functions, for example NMS and Argsort, require a sorting step. NMS removes predicted areas which are very similar and would be considered "duplicated", it removes all overlapping areas but the one with the greatest probability. In Argsort the indices of data in an array are returned in an order corresponding to a sorted order of the data, and must therefore be compared and swapped as necessary. Many NNAs currently have no facility to sort inputs and thus the sorting function is currently performed by a CPU, either externally or integrated within the NNA.

However, the RISC-V vector extension provides no method of sorting vector data and data is generally sorted using an algorithm such as quicksort. The time taken for a quicksort algorithm is non-deterministic so the time taken to sort the data will depend on the order in which the data is in. As there is no definitive time the time allowed must be set to the worst case scenario, such as the numbers being entirely reversed. This may be longer than the function actually takes in a non-worst case scenario.

To expedite sorting over the current quicksort method it would be desirable to provide a method of sorting using the RISC-V vector extension which is therefore optimised for sorting (larger) vectors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to the invention there is method comprising comparing pairs of elements in an array. The method comprises generating two new vectors from an original array in memory or vector register, each comprising one part of each pair to be compared. The two new vectors are compared to generate a mask which indicates which of each pair of elements is less. Based on the mask, elements of the vectors can be swapped as necessary. This could be using a XOR algorithm, a gather algorithm or a merge algorithm. The vectors are then written back to the original array in memory. This process can be repeated on elements of an array as part of a bitonic sorting algorithm.

The invention is defined by the claims.

According to an aspect, there is provided a machine implemented method of comparing a plurality of elements in a first array in memory, using vector instructions in a CPU, the method comprising the steps of: generating a first vector with elements of the array specified by a first reference vector, the first vector having the first elements of each pair of elements to be compared, generating a second vector with elements of the array specified by a second reference vector, the second vector having the second elements of each pair of elements to be compared, comparing respective elements of the first vector and the second vector to generate a mask to indicate which of the respective elements of the first and second vector is more or less, processing the first vector and the second vector to swap the positions of only elements of the first vector and second vector indicated by the mask.

Although the method describes generating first and second vectors this could equally well be achieved by generating a single vector with a first portion (corresponding to the first vector) and a second portion (corresponding to the second vector). Similarly, there may simply be a single reference vector with two portions.

The method may further comprise storing elements of the first vector back into the first array at positions defined by the first reference vector and storing elements of the second vector back into the array in memory at positions defined by the second reference vector.

A series of XOR vector instructions can be used to process the first vector and second vector to swap the positions of only elements of the first vector and second vector indicated by the mask. The series of XOR vector instructions may comprise three XOR vector instructions:
   a vector instruction performing the first vector XOR the second vector of elements indicated by the mask and outputting to the first vector;
   a vector instruction performing the first vector XOR the second vector of elements indicated by the mask and outputting to the second vector; and
   a vector instruction performing the first vector XOR the second vector of elements indicated by the mask and outputting to the first vector.

A series of merge vector instructions can be used to process the first vector and second vector to swap the positions of only elements of the first vector and second vector indicated by the mask.

The method may be repeated a plurality of times, each time forming comparison step in a bitonic sorting algorithm, the method being repeated until the bitonic sorting algorithm is complete.

The method may be repeated a plurality of times, each time forming a comparison step in a bitonic sorting algorithm, the method being repeated until the bitonic sorting algorithm is complete and, for second and subsequent repetitions, generating a first vector with elements of the first array comprises generating a first vector with elements of the first and second vector from the previous repetition and generating a second vector with elements of the first array comprises generating a second vector with elements of the first and second vector from the previous repetition, and further comprising, once the repetitions are complete, storing elements of the first vector back into the first array.

The elements of the first reference vector are the locations of the first element of each pair to be compared in an comparison step of a bitonic sorting algorithm and the elements of the second reference vector are the locations of the second element of each pair to be compared in the same iteration of a bitonic sorting algorithm.

If the number of elements in the array is not a power of 2, elements are added to the array until it the number of elements is a power of 2, each element added being the same of either a maximum value or a minimum value. Alternatively a single additional element can be added as this is referred to on each occasion.

Comparing respective elements of the first vector and the second vector to generate a mask to indicate which of the respective elements of the first vector is more or less may comprise one or more of the following functions: more than, less than, more than or equal to, less than or equal to.

The method may further comprise forming the first array in memory, each single element of the first array comprising an element of an array for comparison followed by either an identification of the element or an original location of the element.

The method may further comprise comparing a plurality of elements in a meta array in memory, wherein each element of the meta array comprises either identification data of the corresponding element in the first array or original location data of the corresponding element in the first data array, the method comprising generating a first meta vector with elements of the meta array specified by the first reference vector, generating a second meta vector with elements of the meta array specified by the second reference vector, processing the first meta vector and the second meta vector to swap the positions of only elements of the first meta vector and the second meta vector indicated by the mask.

The method may further comprise storing elements of the first meta vector back into the meta array and storing elements of the second meta vector back into the meta array. This may use positions defined by the first and second reference vectors. The elements of the first and second meta vectors may be stored back into the meta array after each iteration or alternatively just at the end of all the repetitions. The first and second reference vectors may be used to store elements of the first and second meta vectors back into the meta array.

The data processing system may be embodied in hardware on an integrated circuit. There may be provided a method of manufacturing, at an integrated circuit manufacturing system, a data processing system. There may be provided an integrated circuit definition dataset that, when processed in an integrated circuit manufacturing system, configures the system to manufacture a data processing system. There may be provided a non-transitory computer readable storage medium having stored thereon a computer readable description of a data processing system that, when processed in an integrated circuit manufacturing system, causes the integrated circuit manufacturing system to manufacture an integrated circuit embodying a data processing system.

There may be provided an integrated circuit manufacturing system comprising: a non-transitory computer readable storage medium having stored thereon a computer readable description of the data processing system; a layout processing system configured to process the computer readable description so as to generate a circuit layout description of an integrated circuit embodying the data processing system; and an integrated circuit generation system configured to manufacture the data processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

A bitonic sorting algorithm provides a way of sorting elements in a predetermined number of steps. As a predetermined number of steps is used the time taken for a bitonic sorting algorithm is deterministic. It has been recognised that a deterministic sorting time would be preferable in the context of a CPU supporting an associated NNA, as this would simplify scheduling, e.g. within the associated NNA.

Figure 1:
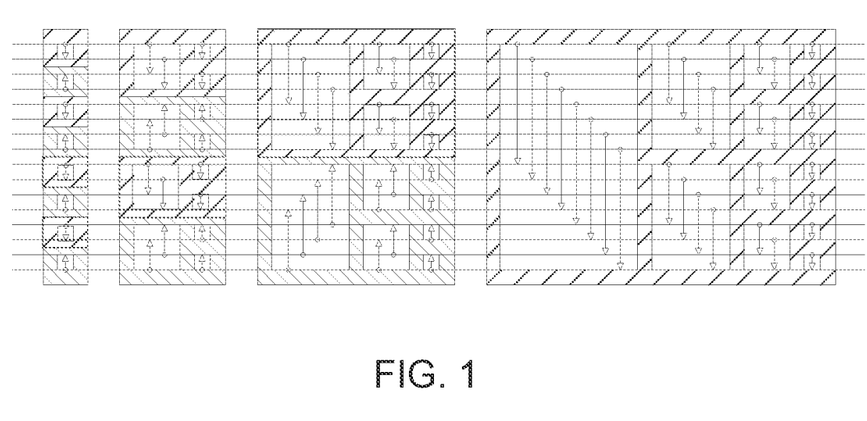
FIG. 1 shows a bitonic sorting algorithm.

FIG. 1 depicts a bitonic sorting algorithm for 16 inputs (represented by the lines going from left to right). In a first stage (the first set of cross-hatched boxes on the left of FIG. 1) adjacent pairs of elements are compared, with the smaller of the numbers being moved to the position at the end of the arrow. The second stage comprises sorting groups of four using two sorting phases (i.e. each phase comprises each position being compared to one other, and this happens twice for each position in the second stage). Again, for each pair compared, the smaller element is located, or moved, to the end of the arrow. A third stage sorts groups of eight and comprises three phases. Lastly, a fourth stage comprises four sorting phases and sorts the group of 16. Thus, 16 elements can be sorted in 10 steps in which every element is compared to another. So an array of $2^n$ can be sorted in $n(n+1)/2$ phases.

Figure 2:
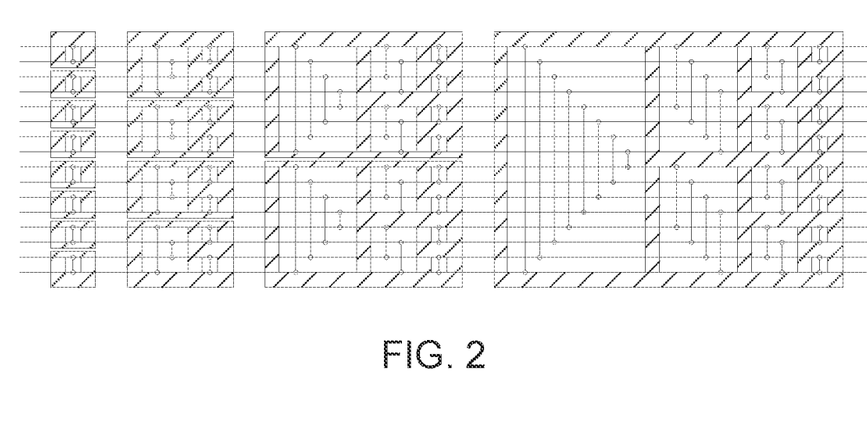
FIG. 2 depicts an alternative bitonic sorting algorithm.

An alternative bitonic sorting algorithm is depicted in FIG. 2. In this bitonic sorting algorithm each pair of data elements is always sorted in the same direction. So, the larger of each pair of elements can be moved to the bottom, resulting in an ascending sequence. Alternatively, the larger of each pair of elements can be moved to the top, resulting in a descending sequence.

The RISC-V vector extension includes a variety of different instructions, examples of which include:

Vloxei8.v vd, (rs1), vr1, vm: this loads specific elements from an array specified in register rs1 into vector vd. Positions of specified elements to load are indicated by vr1. A mask vm may be used, but if no mask is used the operation is performed on all elements of the vector.

Vle8.v vd, (rs1), vm: this loads consecutive elements from an array specified in register rs1 into vector vd. A mask vm may be used, but if no mask is used the operation is performed on all elements of the vector.

Vlse8.v vd, (rs1), rs2, vm: this loads a sequence of elements from an array specified in register rs1 into vector vd using a stride specified in register rs2. A mask vm may be used, but if no mask is used the operation is performed on all elements of the vector.

Vmslt.vv vd vs1, vs2, vm: if a respective element from vector vs1 is less than the respective element from vs2 then a 1 bit is output to vector vd, if not a 0 bit is output to vector vd. A mask vm can be used, but if no mask is used the operation is performed on all elements of the vector.

Vxor.vv vd, vs2, vs1, vm: is a bitwise instruction which writes to destination vd the output of an exclusive or operation between vs2 and vs1. The operation is performed only for elements indicated by mask vm.

Vsoxei8.v vs3, (rs1), vs2, vm: writes elements of vs3 to an array specified in register rs1 at positions defined by vs2. Again, a mask vm can be used, but if no mask is used the operation is performed on all elements of the vector.

Vse8.v vs3, (rs1), vm: writes consecutive elements of vs3 to an array specified in register rs1 at consecutive positions. Again, a mask vm can be used, but if no mask is used the operation is performed on all elements of the vector.

Vsse8.v vs3, (rs1), rs2, vm: writes consecutive elements of vs3 to an array specified in register rs1 using a stride specify by register rs2. Again, a mask vm can be used, but if no mask is used the operation is performed on all elements of the vector.

Vmerge.vvm vd, vs1, vs2, vm: if the respective bit in vm is set to 1 then assign the respective element from vs1 to vector vd, if the respective bit in vm is set to 0 then assign the respective element from vs2 to vector vd.

vrgatherei16.vv vd, vs1, vr1, vm: assigns specific elements from vector register specified by vs1 into vector vd. Positions of specified elements are indicated by vr1. A mask vm may be used, but if no mask is used the operation is performed on all elements of the vector.

All or a subset of these ten instructions are used, in a specific way, to compare and sort elements within a vector. Thus elements within a vector can be sorted in ascending (or descending) order.

For all instructions that contain a number in their name (e.g., vrgatherei16.vv or vsse8.v), the number represents a bitdepth to be used. This should not be interpreted as being limiting upon the disclosed invention. Using other bitdepths (i.e., 8, 16, 32 and 64) is optional, therefore we could use Vloxei64.v, Vloxei32 or Vloxei16 instead of Vloxei8.

Figure 3:
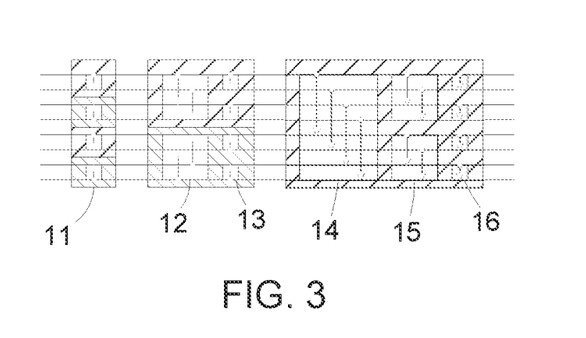
FIG. 3 depicts a bitonic sorting algorithm for 8 elements.
Figure 4:
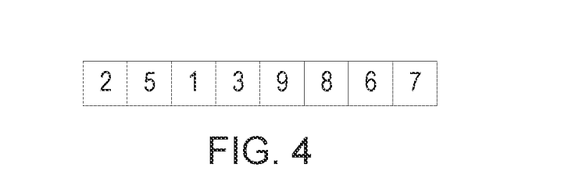
FIG. 4 depicts an array for sorting.
Figure 5:
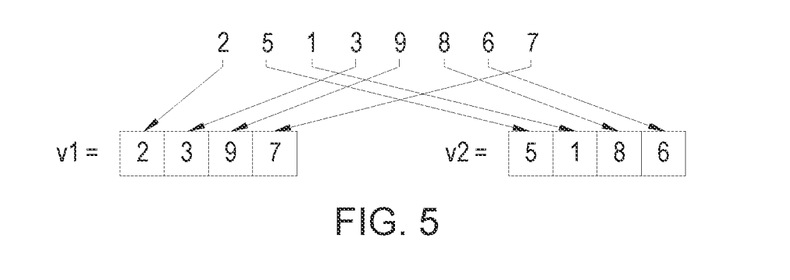
FIG. 5 depicts the formation of a first vector and a second vector for the first phase of a bitonic sorting algorithm.

FIG. 3 depicts a bitonic sorting arrangement for 8 elements. As can be seen, it has 6 phases, 11, 12, 13, 14, 15, 16. The steps to achieve the first phase through a series of vector operations will now be described. The first sorting step in the phase compares adjacent pairs of elements. An example array of eight elements to be sorted is depicted in FIG. 4. The array is [2, 5, 1, 3, 9, 8, 6, 7], with the eight elements being considered to be indexed from 0 (being the first element, 2) to 7 (being the eighth element, 7). The first step in this phase is to generate two new vectors (each of half the size of the original array) including one part of each pair to be compared. The two vectors are constructed so that one vector includes all the elements at the starts of the comparison arrows for that phase, and the other includes all elements at the ends of the comparison arrows for that phase. Thus, according to the sorting arrangement depicted in FIG. 3 the first vector will include the elements indexed [0, 3, 4 and 7]. The second vector will include the elements indexed [1, 2, 5 and 6]. The first vector is generated using Vloxei8.v v1, (rs1), vr1 where rs1 is the register for the array to be sorted, vr1 is a reference vector indicating the positions of the elements to be loaded and a first vector v1 is generated. So, to generate the first vector v1 the reference vector, vr1 would be [0, 3, 4 and 7]. No mask is used in this instruction. A second vector is generated using: Vloxei8.v v2, (rs1), vr2. Thus, the same source array is used but a second vector v2 is generated using elements of array indicated by the second reference vector. The second reference vector would be [1, 2, 5, 6]. There are now two vectors: v1=[2, 3, 9, 7], v2=[5, 1, 8, 6], as depicted in FIG. 5.

Figure 6:
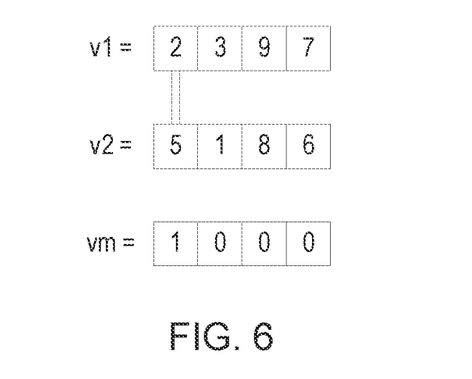
FIG. 6 depicts the generation of a mask.

The next step is to compare the first vector v1 and the second vector v2 and this is depicted in FIG. 6. This uses the function Vmslt.vv vm, v1, v2. No mask is used in this function. However, a mask vm (for use in later steps) is generated. If an element of v1 is less than the corresponding element of v2 a 1 bit is output to mask vm, if not a 0 bit is output. Thus a mask vm which indicates which elements of v1 and v2 need to be swapped is generated. As can be seen, the first elements of v1 and v2 need to be swapped but the second, third and fourth elements do not need to be swapped.

Figure 7A:
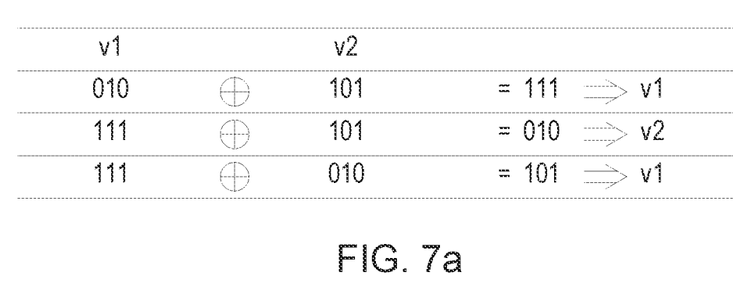
FIG. 7a depicts a XOR swap algorithm.
Figure 7B:
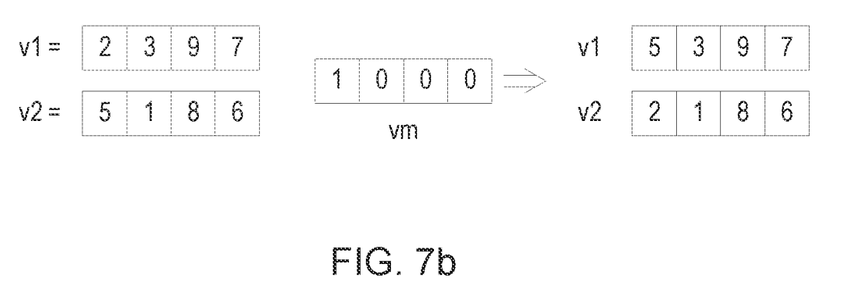
FIG. 7b depicts a XOR swap algorithm with a mask.

Three XOR functions may be used to swap data elements without using any temporary variables as follows:
X XOR Y=>X
X XOR Y=>Y
X XOR Y=>X Instruction Vxor.vv vd, vs2, vs1, vm can be used to swap only elements of v2 and v1 indicated by mask vm as follows:
Vxor.vv v1, v1, v2, vm
Vxor.vv v2, v1, v2, vm
Vxor.vv v1, v1, v2, vm The mask generated in the step depicted in FIG. 6 means that only the first elements of v1 and v2 will be swapped. Vxor.vv operates bit wise and the swapping of the first elements of v1 and v2 using a bit wise operation is depicted in FIG. 7a. FIG. 7b depicts the overall step of using three Vxor.vv operations on v1 and v2 in combination with mask vm.

As an alternative to using three vxor.vv instructions two vmerge.vvm instructions may be used. This method uses two steps, rather than three, although it requires the use of an additional vector register, v2a, for an updated second vector. The method is as follows:

Vmerge.vvm v2a, v2, v1, vm
Vmerge.vvm v1, v1, v2, vm

So, v1 after the vmerge.vvm steps will have any elements indicated by the mask swapped with the corresponding element of v2. v2a is an updated second vector which includes elements of v2 but with those elements indicated by the mask swapped with v1.

In either case, following the swapping of the elements, the final step in this phase is to write the elements back to the original array using the function Vsoxei8.v twice. The first time Vsoxei8.v v1, (rs1), vr1 writes the elements of vector v1 back to the array at destination rs1 at the positions indicated in reference vector vr1 [0, 3, 4, 7]. Then Vsoxei8.v vs2, (rs1), vr2 (or Vsoxei8.v vs2a (rs1), vr2 when merge instructions have been used) writes the elements of the (updated) second vector back to the array at destination rs1 at the positions indicated in reference vector vr2 [1, 2, 5, 6]. The final array, for this phase of this bitonic sorting has elements with the values [5, 2, 1, 3, 9, 8, 6, 7].

The next phase in the bitonic sorting algorithm 12 compares different pairs of elements in the array and therefore different reference vectors are used. For the second phase the first reference vector vr1 would be [0, 1, 6, 7] so the first vector would be [5, 2, 6, 7]. The second reference vector would be [2, 3, 4, 5] so the second vector would be [1, 3, 9, 8]. Once the second phase has been performed the resulting array has elements with the values [5, 3, 1, 2, 6, 7, 9, 8].

The process is repeated for each phase of the bitonic sorting algorithm. For each phase the reference vectors and the vectors would be as follows:

| Phase | | | | Array |
|---|---|---|---|---|
| | | | | [2, 5, 1, 3, 9, 8, 6, 7] |
| 11 | Vr1 [0, 3, 4, 7]<br>Vr2 [1, 2, 5, 6] | V1 [2, 3, 9, 7]<br>V2 [5, 1, 8, 6] | Vm [1, 0, 0, 0] | |
| | | | | [5, 2, 1, 3, 9, 8, 6, 7] |
| 12 | Vr1 [0, 1, 6, 7]<br>Vr2 [2, 3, 4, 5] | V1 [5, 2, 6, 7]<br>V2 [1, 3, 9, 8] | Vm [0, 1, 1, 1] | |
| | | | | [5, 3, 1, 2, 6, 7, 9, 8] |
| 13 | Vr1 [0, 2, 5, 7]<br>Vr2 [1, 3, 4, 6] | V1 [5, 1, 7, 8]<br>V2 [3, 2, 6, 9] | Vm [0, 1, 0, 1] | |
| | | | | [5, 3, 2, 1, 6, 7, 8, 9] |
| 14 | Vr1 [0, 1, 2, 3]<br>Vr2 [4, 5, 6, 7] | V1 [5, 3, 2, 1]<br>V2 [6, 7, 8, 9] | Vm [1, 1, 1, 1] | |
| | | | | [6, 7, 8, 9, 5, 3, 2, 1] |
| 15 | Vr1 [0, 1, 4, 5]<br>Vr2 [2, 3, 6, 7] | V1 [6, 7, 5, 3]<br>V2 [8, 9, 2, 1] | Vm [1, 1, 0, 0] | |
| | | | | [8, 9, 6, 7, 5, 3, 2, 1] |
| 16 | Vr1 [0, 2, 4, 6]<br>Vr2 [1, 3, 5, 7] | V1 [8, 6, 5, 2]<br>V2 [9, 7, 3, 1] | Vm [0, 1, 0, 0] | |
| | | | | [9, 8, 7, 6, 5, 3, 2, 1] |

This can be implemented on a CPU with a RISC-V vector extension so that elements within an array can be compared and sorted.

As a refinement of this approach, in phases where it is known (because of the structure of the bitonic sort algorithm) that the first and second vectors will be loaded from strided memory positions, then it is more efficient to use a strided load than the Vloxei8.v instruction (i.e. the position of the first element to be loaded and the stride is all that is required in order to deduce the positions of the subsequent positions/vector elements). Similarly a strided store can be used in corresponding situations instead of Vsoxei8.v.

As an alternative approach, instead of using Vloxei8.v and Vsoxei8.v for every phase, Vrgather.vv can be used over a group of phases. In this approach, Vrgather.vv is called at the start of each phase to produce the first and second vectors. Thus, in the first phase a single Vrgather.vv would take elements indexed [1, 2, 5, 6] from a vector register and output to the upper or lower half of a destination vector of the same size as the input array (i.e. eight elements), and it would take elements indexed [0, 3, 4, 7] and output to the other half of the destination vector. Vrgather.vv can also be used as an alternative to the XOR swap algorithm. In each subsequent phase, a gather operation operates over the full eight element vector output from the previous phase to appropriately swap elements between the top half and the bottom half (the top and bottom halves corresponding to the first and second vectors respectively). In the final phase in the group, the output of the eight element gather can be output back to the original array. In other words, in contrast to the Vloxei8.v and Vsoxei8.v approach, in which the elements are written back to the original array at the end of each phase, in this approach the elements are written back to the original array only at the end of the group of phases.

The description has used the function Vmslt.vv vd vs1, vs2, vm but the invention could equally be implemented using a more than function to sort the elements in an ascending, rather than descending order. Similarly, a less than or equal to or a more than or equal to function could be used.

The present invention therefore provides a method of sorting an array within a predetermined number of steps and therefore within a deterministic time. In one implementation, the new method was found to sort 64 elements 6.4 times faster than a conventional quicksort algorithm when the elements were initially randomly sorted and, for elements that were initially reverse sorted, the present invention was 16 times faster than a conventional quicksort algorithm.

The example above sorts an array of size 8. Additional stages could be used to sort arrays of size 16, 32, 64, etc. If an array is not of a size $2^n$ then additional elements can be added to make the array of a size $2^n$. The additional elements could be either the maximum value for the number of bits or 0. For example, an array of size 5, with four bits per element (each element being an unsigned number, i.e. so all bits contribute to the value of the element) could have an additional three elements of 15. So an array [6, 3, 11, 7, 4] would become [6, 3, 11, 7, 4, 15, 15, 15]. The array now has eight elements and can now be sorted using a bitonic sorting algorithm of three stages and six phases. The additional elements could be at the beginning of the input or at the end (or anywhere, although it may be simpler for the system to add the elements at the beginning or the end, depending on the circumstances, rather than in the middle), but due to the deterministic nature of the bitonic sort algorithm the positions at which the additional elements are added does not affect the overall sort time.

FIG. 2 represents a bitonic sorting algorithm in which the greatest (or smallest) value is always moved in the same direction. If additional elements have been added that are either the maximum or the minimum then it is not necessary to carry out the sorting of those elements (because they are known to be the maximum or minimum).

As an alternative to padding the array to a size $2^n$ and performing the full method on all the elements the second implementation of the bitonic sorter, depicted in FIG. 2, could be used. As the smallest value is always moved in the same direction it is not necessary to include the additional, added, elements in the algorithm.

Furthermore, it is not necessary to add all the additional elements: a single additional maximum or minimum element could be added. The reference vectors could then simply refer to the additional maximum or minimum element. For example, an array of size six [4, 5, 2, 3, 9, 8] could be expanded to [4, 5, 2, 3, 9, 8, MAX]. Then, instead of a reference vectors vr1=[0, 2, 4, 6] and vr2=[1, 3, 5, 7] there would be vr1=[0, 2, 4, 6] and vr2=[1, 3, 5, 6] as both reference vectors could refer to the same stored element.

The description above describes how data elements within an algorithm are sorted. The data elements often have an identification or location. For example, the elements may represent a variable of a data block (with an identification or location) and the elements must be linked back to the data block. This can be achieved using compound numbers such that the identification is appended onto the end of the number. As the element forms the more significant bits, the number (rather than the identification) will be sorted. The identification and the element are therefore linked and the identification can be extracted from the compound number to identify, for example, the data block. An example is given:

| Number | | Identification | | | |
|---|---|---|---|---|---|
| Decimal | Binary | Decimal | Binary | Binary | Decimal |
| 10 | 1010 | 0 | 0000 | 10100000 | 160 |
| 5 | 0101 | 1 | 0001 | 01010001 | 81 |
| 6 | 0110 | 2 | 0010 | 01100010 | 98 |
| 1 | 0001 | 3 | 0011 | 00010011 | 19 |

The present invention can be used on the compound numbers and an identical order of numbers will result.

An alternative to using compound number is to form a meta array comprising the identification or original data location of each element. Then, the mask generated by the less than function for the original data can be used on the meta array. For each phase the mask indicates which elements need to be swapped. This can be used to sort the meta array (comprising identification data) the same way that the number data was sorted: in each phase only identification data corresponding to elements which are swapped are swapped.

To sort the meta data two meta vectors must be generated using the same reference vectors as used in the corresponding phase of the sorting algorithm. Unlike the original sorting algorithm no less than/more than step is needed to identify which elements need to be swapped because the mask from the original sorting algorithm can be used. Also, as it is already known which elements need to be swapped, then the mask can be used to only load and store the values needed. Using the mask the meta vectors can be swapped as necessary. This can be achieved using the XOR swap algorithm described above, the merge algorithm or the Vrgather.vv option can be used. For an identification array at ri1 the instructions would be:

Vloxei8.v vi1, (ri1), vr1, vm
Vloxei8.v vi2, (ri1), vr2, vm
Vxor.vv vi1, vi1, vi2, vm
Vxor.vv vi2, vi1, vi2, vm
Vxor.vv vi1, vi1, vi2, vm
Vsoxei8.v vi1, (ri1), vr1, vm
Vsoxei8.v vi2, (ri1), vr2, vm This process can be repeated for each phase of the bitonic sorting algorithm until the meta array is sorted in exactly the same way as the data array.

NNAs sometimes need to order elements but they do not have a specific operation to achieve this. However, this invention provides a method in which the elements can be ordered in a separate processing unit. As the time taken is deterministic it is simple to correctly schedule operations on the NNA that are dependent on the sorting operation.

Figure 8:
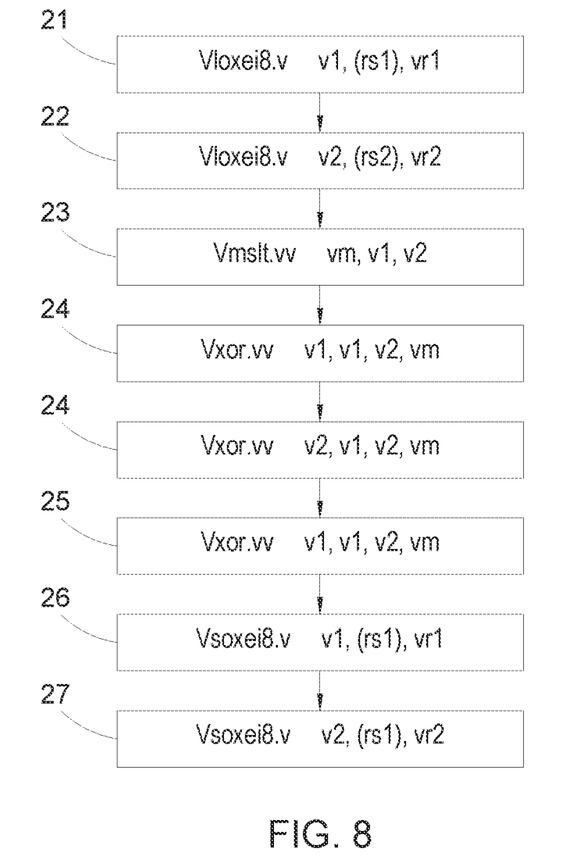
FIG. 8 depicts a process according to the invention.
Figure 9:
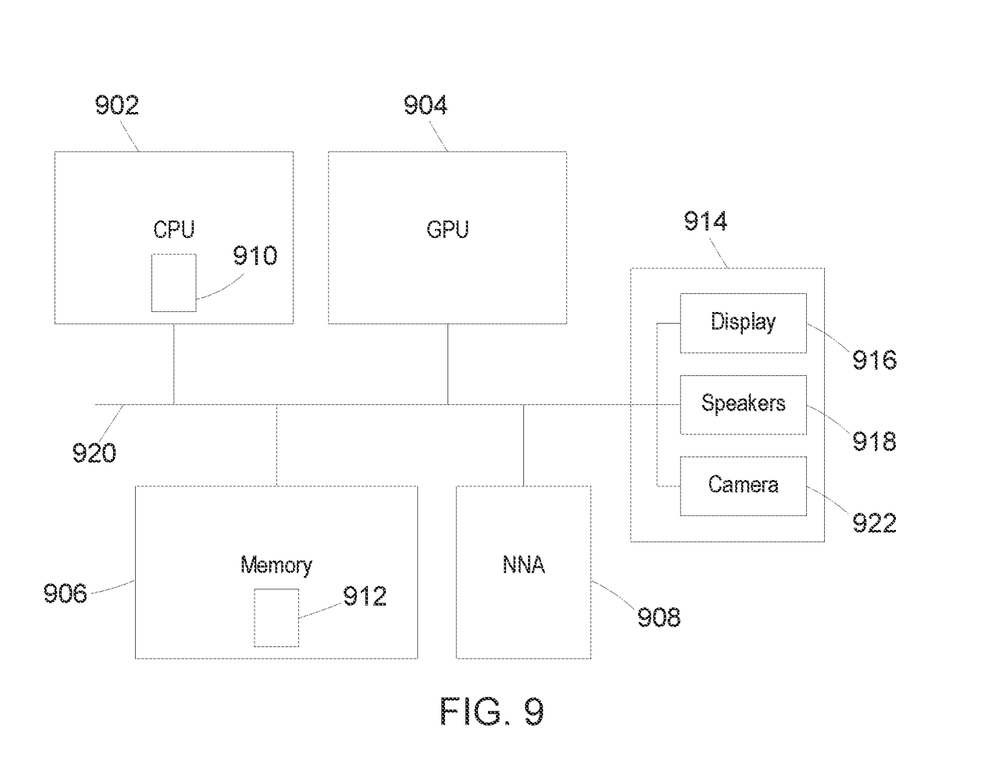
FIG. 9 shows a computer system in which a graphics processing system is implemented.

FIG. 9 shows a computer system in which processing systems described herein may be implemented. The computer system comprises a CPU 902, a GPU 904, a memory 906, a neural network accelerator (NNA) 908 and other devices 914, such as a display 916, speakers 918 and a camera 922. A processing block 910 (carrying out the method of FIG. 8) is implemented on the CPU 902. In other examples, one or more of the depicted components may be omitted from the system, and/or the processing block 910 may be implemented on the GPU 904 or within the NNA 908. The components of the computer system can communicate with each other via a communications bus 920. A store 912 is implemented as part of the memory 906.

While FIG. 9 illustrates one implementation of a graphics processing system, it will be understood that a similar block diagram could be drawn for an artificial intelligence accelerator system—for example, by replacing either the CPU 902 or the GPU 904 with a Neural Network Accelerator (NNA), or by adding the NNA as an additional unit. In such cases, the processing block 910 can be implemented in the NNA.

The hardware units described herein may be embodied in hardware on an integrated circuit. The hardware units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java® or OpenCL®. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a hardware unit configured to perform any of the methods described herein, or to manufacture a hardware unit comprising any apparatus described herein. An integrated circuit definition dataset may be, for example, an integrated circuit description.

Therefore, there may be provided a method of manufacturing, at an integrated circuit manufacturing system, a hardware unit as described herein. Furthermore, there may be provided an integrated circuit definition dataset that, when processed in an integrated circuit manufacturing system, causes the method of manufacturing a hardware unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a hardware unit will now be described with respect to FIG. 9.

Figure 10:
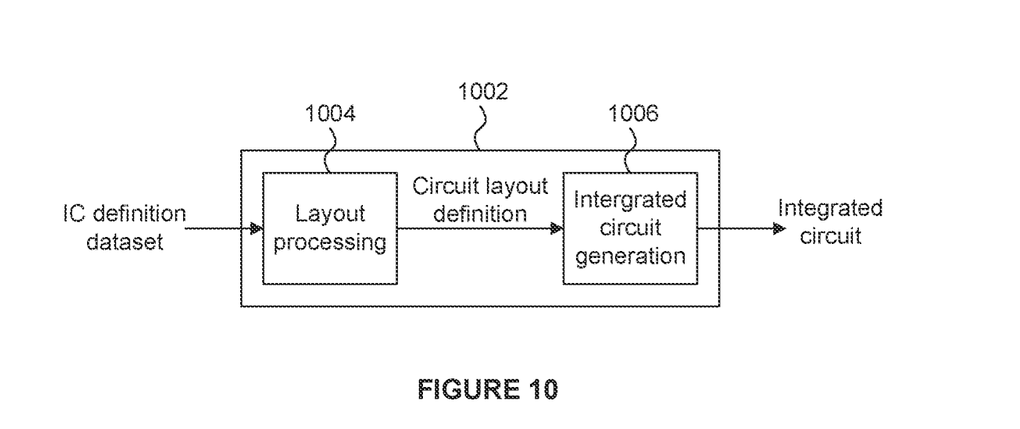
FIG. 10 shows an integrated circuit manufacturing system for generating an integrated circuit embodying a graphics processing system.

FIG. 10 shows an example of an integrated circuit (IC) manufacturing system 1002 which is configured to manufacture a hardware unit in any of the examples herein. In particular, the IC manufacturing system 1002 comprises a layout processing system 1004 and an integrated circuit generation system 1006. The IC manufacturing system 1002 is configured to receive an IC definition dataset (e.g. defining a hardware unit as described in any of the examples herein), process the IC definition dataset, and generate an IC according to the IC definition dataset (e.g. which embodies a hardware unit as described in any of the examples herein). The processing of the IC definition dataset configures the IC manufacturing system 1002 to manufacture an integrated circuit embodying a hardware unit as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a hardware unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A machine implemented method of sorting a plurality of elements in a first array in memory, using vector instructions in a CPU, the method comprising:
   generating, by a CPU, a first vector with elements of the first array specified by a first reference vector, the first vector having the first elements of each pair of elements to be compared;
   generating, by a CPU, a second vector with elements of the first array specified by a second reference vector, the second vector having the second elements of each pair of elements to be compared;
   comparing, by a CPU, respective elements of the first vector and the second vector to generate a mask to indicate which of the respective elements of the first and second vector is more or less;
   processing the first vector and the second vector to swap the positions of only elements of the first vector and second vector indicated by the mask; and
   sorting the plurality of elements in said first array into an order determined by the processing of the first and second vectors.

2. The machine implemented method according to claim 1, further comprising:
   storing elements of the first vector back into the first array at positions defined by the first reference vector; and
   storing elements of the second vector back into the array in memory at positions defined by the second reference vector.

3. The machine implemented method according to claim 1, wherein processing the first vector and the second vector to swap the positions of only elements of the first vector and second vector indicated by the mask uses a series of XOR vector instructions.

4. The machine implemented method according to claim 1, wherein the series of XOR vector instructions comprises:
   a vector instruction performing the first vector XOR the second vector of elements indicated by the mask and outputting to the first vector;
   a vector instruction performing the first vector XOR the second vector of elements indicated by the mask and outputting to the second vector; and
   a vector instruction performing the first vector XOR the second vector of elements indicated by the mask and outputting to the first vector.

5. The machine implemented method according to claim 1, wherein processing the first vector and the second vector to swap the positions of only elements of the first vector and second vector indicated by the mask comprises using a series of merge instructions.

6. The machine implemented method according to claim 1, further comprising repeating the method a plurality of times, each time forming the comparison in a bitonic sorting algorithm, the method being repeated until the bitonic sorting algorithm is complete.

7. The machine implemented method according to claim 1, wherein the first array is stored in memory.

8. The machine implemented method according to claim 1, further comprising repeating the method a plurality of times, each time forming the comparison in a bitonic sorting algorithm, the method being repeated until the bitonic sorting algorithm is complete and, for second and subsequent repetitions, generating a first vector with elements of the first array comprises generating a first vector with elements of the first and second vector from the previous repetition and generating a second vector with elements of the first array comprises generating a second vector with elements of the first and second vector from the previous repetition, and further comprising, once the repetitions are complete, storing elements of the first vector back into the first array.

9. The machine implemented method according to claim 1, wherein the first array is in a vector register.

10. The machine implemented method according to claim 1, wherein the elements of the first reference vector are the locations of the first element of each pair to be compared in a comparison step of a bitonic sorting algorithm and the elements of the second reference vector are the locations of the second element of each pair to be compared in the same iteration of a bitonic sorting algorithm.

11. The machine implemented method according to claim 1 wherein, if the number of elements in the array is not a power of 2, elements are added to the array until it the number of elements is a power of 2, each element added being the same of either a maximum value or a minimum value.

12. The machine implemented method according to claim 1, wherein comparing respective elements of the first vector and the second vector to generate a mask to indicate which of the respective elements of the first vector is more or less comprises one or more of the following functions: more than, less than, more than or equal to, less than or equal to.

13. The machine implemented method according to claim 12, wherein comparing respective elements of the first vector and the second vector to generate a mask indicates which of the respective elements of first and second tensors is less.

14. The machine implemented method according to claim 1, further comprising forming the first array in memory, each single element of the first array comprising an element of an array for comparison followed by either an identification of the element or an original location of the element.

15. The machine implemented method according to claim 1, further comprising comparing a plurality of elements in a meta array in memory, wherein each element of the meta array comprises either identification data of the corresponding element in the first array or original location data of the corresponding element in the first data array, the method further comprising:
   generating a first meta vector with elements of the meta array specified by the first reference vector;
   generating a second meta vector with elements of the meta array specified by the second reference vector; and
   processing the first meta vector and the second meta vector to swap the positions of only elements of the first meta vector and the second meta vector indicated by the mask.

16. The machine implemented method according to claim 15, further comprising:
   storing elements of the first meta vector back into the meta array; and
   storing elements of the second meta vector back into the meta array.

17. The machine implemented method according to claim 1, wherein the elements to be sorted are object predictions in a non-maximum suppression layer in an object detection network.

18. A graphics processing system configured to perform the method as set forth in claim 1.

19. A non-transitory computer readable storage medium having stored thereon computer readable code configured to cause the method as set forth in claim 1 to be performed when the code is run.

20. A non-transitory computer readable storage medium having stored thereon a computer readable dataset description of a graphics processing system as set forth in claim 18 that, when processed in an integrated circuit manufacturing system, causes the integrated circuit manufacturing system to manufacture an integrated circuit embodying the graphics processing system.

* * * * *